United States Patent

Yoshinaga

(10) Patent No.: US 9,484,812 B2
(45) Date of Patent: Nov. 1, 2016

(54) DIRECT-CURRENT POWER SUPPLY DEVICE

(71) Applicant: Sanken Electric Co., Ltd., Niiza-shi, Saitama (JP)

(72) Inventor: Mitsutomo Yoshinaga, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 106 days.

(21) Appl. No.: 14/034,677

(22) Filed: Sep. 24, 2013

(65) Prior Publication Data

US 2014/0092642 A1 Apr. 3, 2014

(30) Foreign Application Priority Data

Oct. 3, 2012 (JP) .................................. 2012-221113

(51) Int. Cl.
*H02M 3/156* (2006.01)
*H02M 3/158* (2006.01)
*H05B 33/08* (2006.01)
*H02M 1/00* (2006.01)
*H02M 3/335* (2006.01)

(52) U.S. Cl.
CPC ............ *H02M 3/156* (2013.01); *H02M 3/1582* (2013.01); *H05B 33/0818* (2013.01); *H02M 3/335* (2013.01); *H02M 3/33507* (2013.01); *H02M 2001/0009* (2013.01)

(58) Field of Classification Search
CPC ........... H02M 3/33507; H02M 3/156; H02M 3/335; H02M 3/1582; H02M 2001/0009
See application file for complete search history.

(56) References Cited

U.S. PATENT DOCUMENTS

| 2010/0054000 A1* | 3/2010 | Huynh ....................... 363/21.16 |
| 2010/0309697 A1* | 12/2010 | Werle et al. .................. 363/126 |
| 2011/0109241 A1* | 5/2011 | Kitamura ....................... 315/291 |
| 2012/0201063 A1* | 8/2012 | Sugawara ....................... 363/89 |
| 2012/0207505 A1* | 8/2012 | Kobayashi et al. ............ 399/88 |

FOREIGN PATENT DOCUMENTS

| EP | 2501028 A2 | 9/2012 |
| JP | 2005-198386 A | 7/2005 |
| JP | 2009-512404 A | 3/2009 |
| JP | 2012-016136 A | 1/2012 |
| JP | 2012-23294 A | 2/2012 |
| WO | 2009-004847 A1 | 1/2009 |

OTHER PUBLICATIONS

Official Action issued on Jun. 28, 2016 in the counterpart Japanese application.

* cited by examiner

*Primary Examiner* — Fred E Finch, III
*Assistant Examiner* — Rafael O. De León Domenech
(74) *Attorney, Agent, or Firm* — Mots Law, PLLC

(57) ABSTRACT

The present invention includes: a converter configured to convert the direct-current voltage of the rectifier to another direct-current voltage and supply to a load; a peak hold unit configured to hold a peak value of a current detected by a current detecting unit configured to detect a current flowing in the switching element; an averaging unit configured to convert, to a current, an output of an n/2 output unit, and then integrate and output the converted current, the n/2 output unit configured to output n/2 (n is an integer of 1 or more) of the held peak value only in a regeneration current period of the reactor; a control unit configured to turn the switching element on and off based on an output signal of the averaging unit in such a way that an average current value of a current flowing in the reactor is equal to a predetermined value.

5 Claims, 15 Drawing Sheets

DIRECT-CURRENT POWER SUPPLY DEVICE

TECHNICAL FIELD

The present invention relates to a direct-current power supply device and particularly relates to a direct-current power supply device applied to an LED lighting apparatus using a primary-side constant current control method which requires no constant current feedback circuit.

BACKGROUND ART

FIG. 1 is a block diagram showing a configuration of a conventional direct-current power supply device described in Japanese Patent Application Publication No. 2012-23294. The direct-current power supply device shown in FIG. 1 is applied to an LED lighting apparatus. The LED lighting apparatus includes a power supply device 1 and a parallel circuit which includes a smoothing capacitor Co and an LED group load device RL and which is connected to the power supply device 1. An alternating-current power from an alternating-current power supply AC is converted to a direct-current power to be outputted to the LED group load device RL.

The power supply device 1 includes the alternating-current power supply AC, an EMI filter FL1, a full-wave rectifier circuit RC1, a smoothing capacitor Ci, diodes D1 to D3, a reactor L1, a control IC 100, and a capacitor C1. The EMI filter FL1 is connected to both terminals of the alternating-current power supply AC and an input terminal of the full-wave rectifier circuit RC1 configured to rectify an alternating-current voltage of the alternating-current power supply AC is connected to an output terminal of the EMI filter FL1.

A series circuit of a current detecting resistor Rs and a switching element Q1 including the regeneration diode D1 and a MOSFET is connected to an output terminal of the full-wave rectifier circuit RC1. A series circuit including: a main winding Np of the reactor L1; and the parallel circuit of the smoothing capacitor Co and the LED group load device RL is connected both terminals of the regeneration diode D1.

The control IC 100 turns the switching element Q1 on and off by using an on-off drive signal. The control IC 100 directly detects a load current flowing in the LED group load device RL by using a high-side current detecting unit 20 and inputs the detected load current into a current control error amplifier as a feedback signal FB via a level shift circuit, photocoupler, or the like which is not illustrated, in order that the detected load current can be equal to a predetermined average current value.

An output signal of the current control error amplifier 13 has a response characteristic slower than a half cycle of a sine wave of the alternating-current power supply AC. The PWM comparator 14 turns the switching element Q1 on and off while comparing the output from the current control error amplifier 13 and a triangle wave signal from a triangle wave generator 12 to each other to maintain a constant on-signal width of the switching element Q1.

Accordingly, a peak value of a switching current flowing in the switching element Q1 increases and decreases in a manner similar to a full-wave rectified voltage waveform of the sine wave of the alternating-current power supply AC. The direct-current power supply device thus also has a power-factor improving function.

Moreover, the control IC 100 detects, by using a comparator 11, voltage drop at an end of a regeneration current flowing in the main winding Np of the reactor L1, via the diode D3 based on a voltage signal of an auxiliary winding Nd of the reactor L1. Then, the control IC 100 resets a capacitor voltage of the triangle wave generator 12 and generates turn-on of the switching element Q1. The control IC 100 thereby performs quasi-resonant operation of the switching element Q1.

The conventional circuit shown in FIG. 1 is a low-side step-down chopper circuit in which the control IC 100 is driven with GND (ground) reference. Since the control signal can be inputted with GND reference, on-off operations and light adjusting operations by external signals can be facilitated.

However, since the LED group load device RL is connected to the high side where the voltage is high, the high-side current detecting unit 20 is provided as a circuit for sending the constant current control signal to the control IC 100 which is a GND reference circuit and the circuit configuration for sending the constant current control signal is complicated.

Meanwhile, when the control IC 100 is on the high side (=floating operation), the circuit configuration for the constant current control signal can be simple. However, since the destination of the external signals for the on-off and light adjusting operations is the control IC 100 on the high side, the circuit configuration of the control IC 100 is complicated.

As described above, regardless of being a high-side or low-side chopper circuit, the circuit of the conventional technique has a problem that the circuit configuration for the external control signal or the LED current detection signal is complicated and the cost of the device is high.

SUMMARY OF INVENTION

An object of the present invention is to provide a direct-current power supply device which has a simple circuit configuration and which is low in cost.

The present invention includes: a rectifier configured to perform full-wave rectification of an alternating-current voltage of an alternating-current power supply and convert the alternating-current voltage to a direct-current voltage;

a converter including a switching element, a reactor, and a diode, the converter configured to convert the direct-current voltage of the rectifier to another direct-current voltage by turning the switching element on and off and supply the other direct-current voltage to a load;

a current detecting unit configured to detect a current flowing in the switching element;

a peak hold unit configured to hold a peak value of the current detected by the current detecting unit;

an n/2 output unit configured to output n/2 (n is an integer of 1 or more) of the peak value held by the peak hold unit only in a regeneration current period of the reactor;

an averaging unit configured to convert an output of the n/2 output unit to a current, and then integrate and output the converted current; and a control unit configured to turn the switching element on and off based on an output signal of the averaging unit in such a way that an average current value of a current flowing in the reactor is equal to a predetermined value.

DESCRIPTION OF EMBODIMENTS

Direct-current power supply devices of several embodiments of the present invention are described below in detail with reference to the drawings.

Embodiment 1

Figure 1:
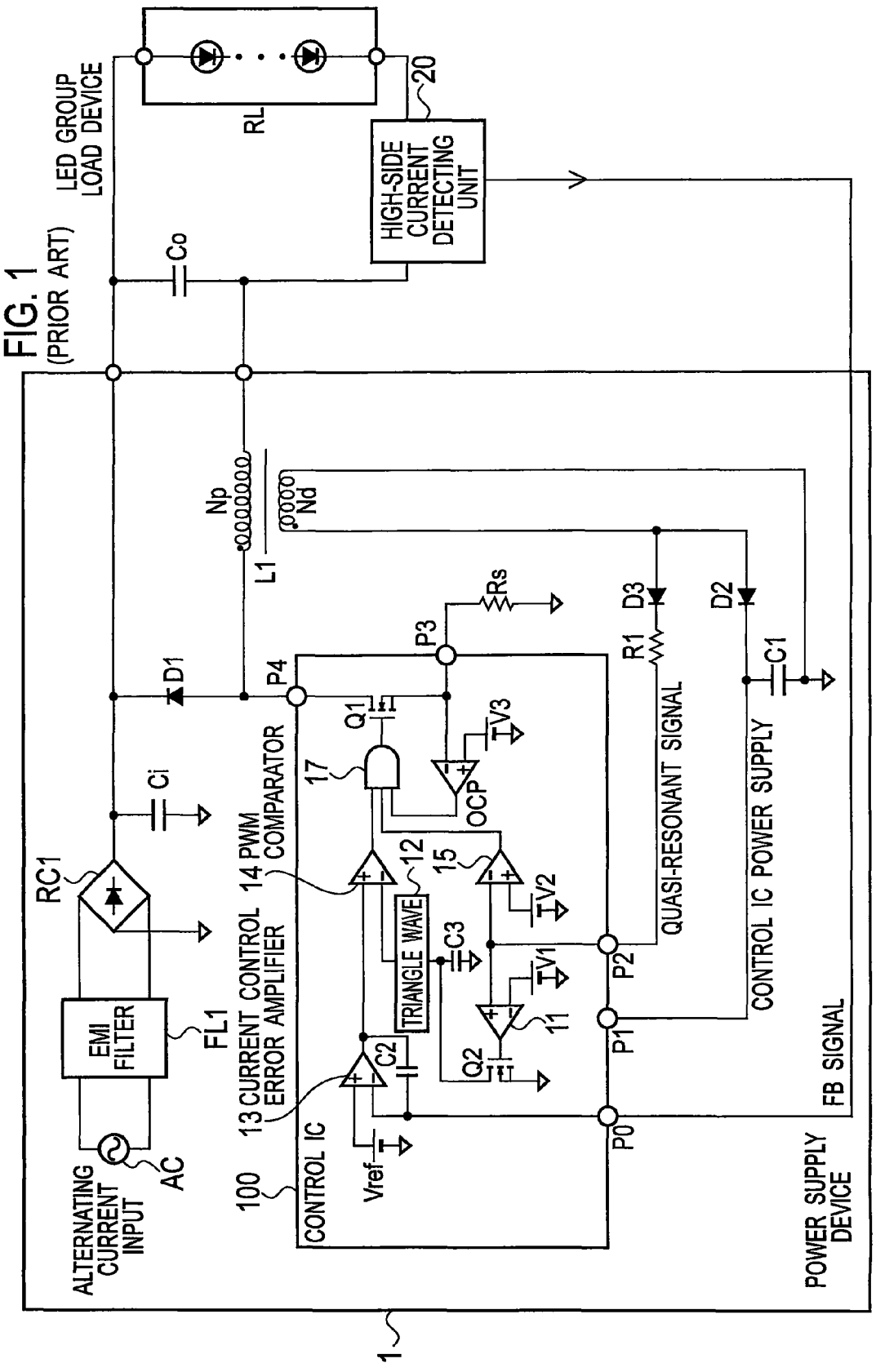
FIG. 1 is a block diagram showing a configuration of a conventional direct-current power supply device.
Figure 2:
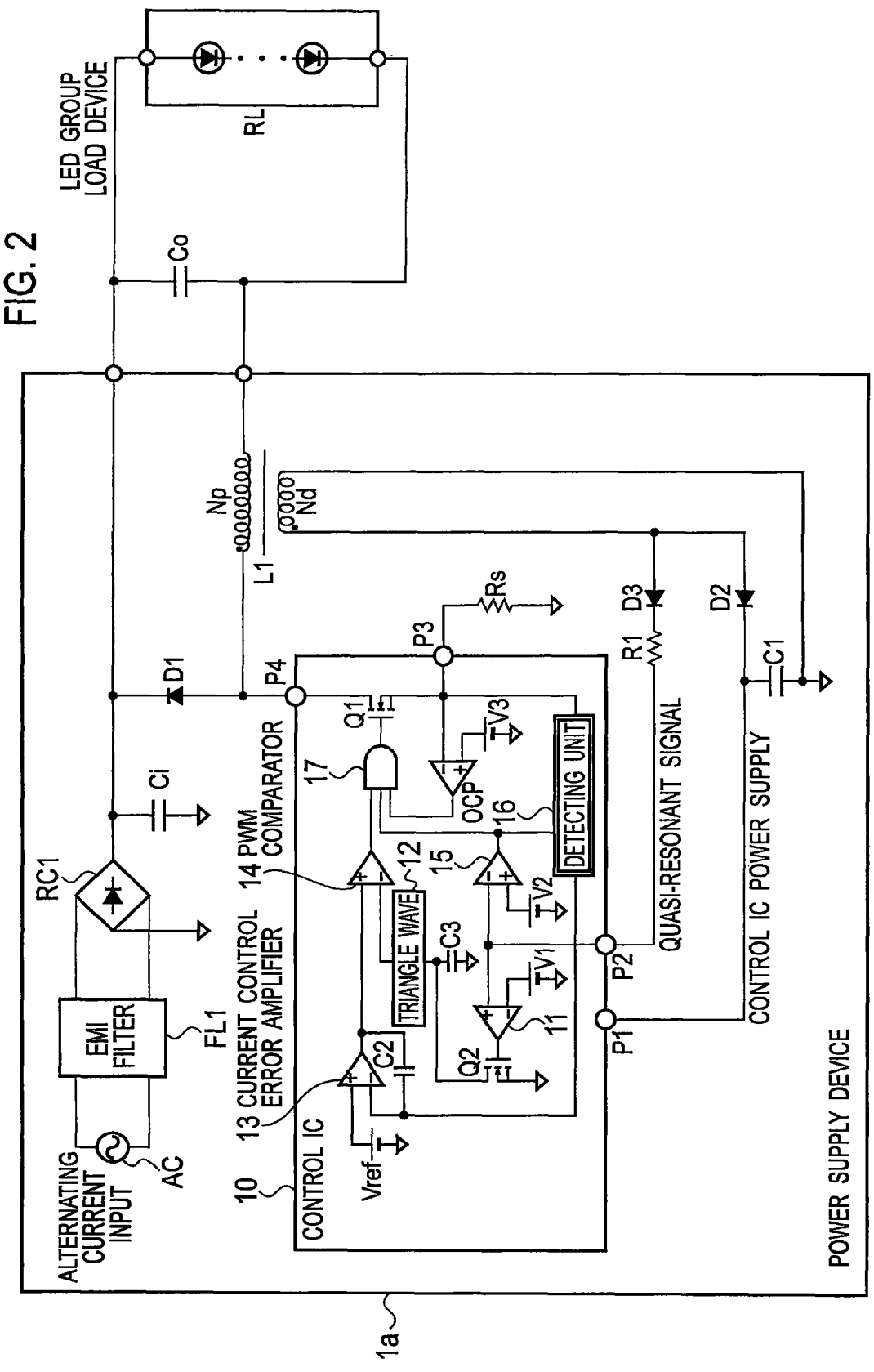
FIG. 2 is a block diagram showing a configuration of a direct-current power supply device in Embodiment 1 of the present invention.

FIG. 2 is a block diagram showing a configuration of a direct-current power supply device in Embodiment 1 of the present invention. The direct-current power supply device is applied to an LED lighting apparatus configured to light an LED group load device RL. Compared to the conventional direct-current power supply device shown in FIG. 1, the direct-current power supply device is characterized in that the high-side current detecting unit 20 is omitted and a detecting unit 16 is provided in a control IC 10. Note that the same configurations as the configurations of the direct-current power supply device shown in FIG. 1 are denoted by the same reference numerals.

A power supply device 1a forms a step-down converter which steps down a direct-current voltage of a full-wave rectifier circuit RC1 by using a diode D1 and a main winding Np and turning a switching element Q1 on and off and which supplies the direct-current voltage to the LED group load device RL.

A reactor L1 includes the main winding Np and an auxiliary winding Nd. A parallel circuit of the LED group load device RL and a smoothing capacitor Co is connected to one terminal of the main winding Np of the reactor L1. An anode of the regeneration diode D1 is connected to the other terminal of the main winding Np. A cathode of the regeneration diode D1 is connected to the parallel circuit of the LED group load device RL and the smoothing capacitor Co and is also connected to a positive electrode output terminal of the full-wave rectifier circuit RC1.

Moreover, a drain of the switching element Q1 is connected to the anode of the diode D1 and the other terminal of the main winding Np of the reactor L1. A source of the switching element Q1 is connected to a negative electrode output terminal of the full-wave rectifier circuit RC1 via a current detecting resistor Rs.

Furthermore, the smoothing capacitor Co, the main winding Np of the reactor L1, and the regeneration diode D1 form a regeneration circuit. When the switching element Q1 switches from on to off, the regeneration circuit regenerates a current flowing in the main winding Np of the reactor L1 and supplies the current to the parallel circuit of the LED group load device RL and the smoothing capacitor Co. In other words, a main winding current of the reactor L1 flows in the parallel circuit of the LED group load device RL and the smoothing capacitor Co, throughout on and off periods of the switching element Q1.

The control IC 10 includes the detecting unit 16', an over-current protection circuit OCP, a current control error amplifier 13, a PWM comparator 14, a triangle wave generator 12, and an AND circuit 17. The detecting unit 16 detects a current flowing in the switching element Q1. The over-current protection circuit OCP limits a current value by turning the switching element Q1 off when a voltage generated by a current flowing in the current detecting resistor Rs exceeds a reference voltage V3.

The PWM comparator 14 compares an output from the current control error amplifier 13 and a triangle wave signal from the triangle wave generator 12 to each other to generate an on-off signal for the switching element Q1. The AND circuit 17 obtains AND of an output of the PWM comparator 14, an output of the over-current protection circuit OCP, and an output of a comparator 15 and outputs an AND output to the switching element Q1 to turn the switching element Q1 on and off.

The source of the switching element Q1, an output terminal of the comparator 15, an input terminal of the AND circuit 17, and an inverting input terminal of the current control error amplifier 13 are connected to the detecting unit 16.

Figure 3:
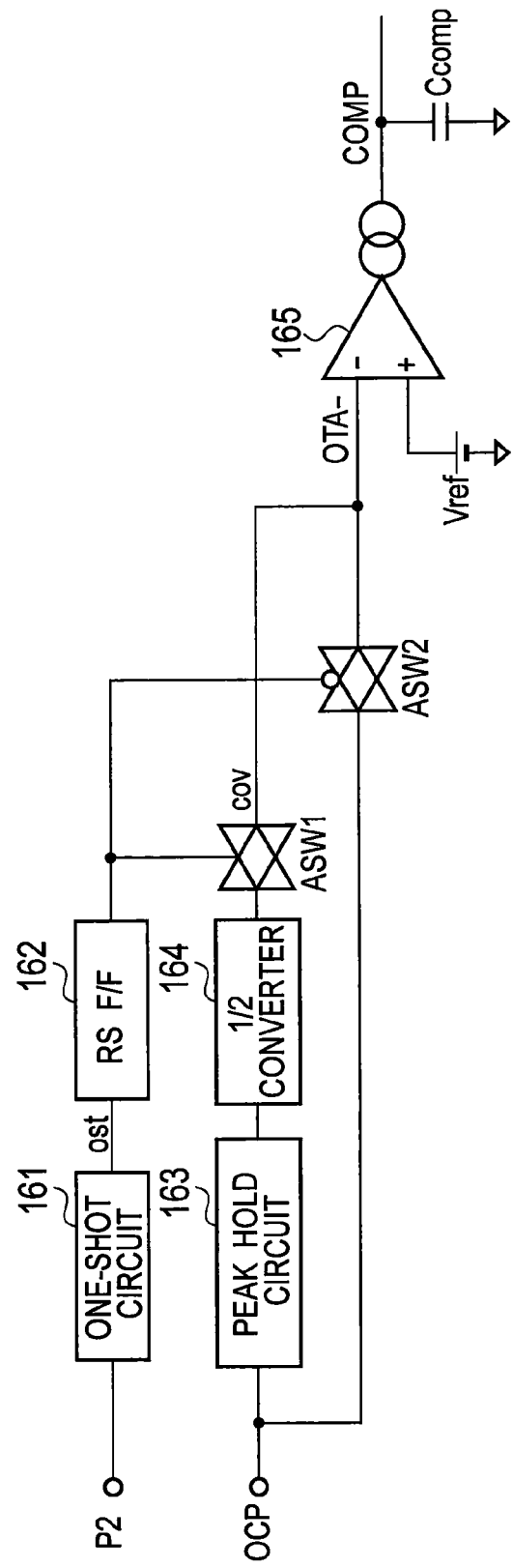
FIG. 3 is a diagram showing a configuration example of a detecting unit in the direct-current power supply device shown in FIG. 2.

As shown in FIG. 3, the detecting unit 16 includes an one-shot circuit 161, a RSF/F 162, a peak hold circuit 163, a ½ converter 164, analog switches ASW1 and ASW2, a voltage-current converting amplifier 165, and a capacitor Ccomp.

The one-shot circuit 161 receives a voltage of the auxiliary winding Nd via the comparator 15 and generates one pulse at each rising edge and each falling edge of the voltage of the auxiliary winding Nd. The RSF/F 162 outputs an on-off signal to the analog switch ASW1 for each pulse from the one-shot circuit 161. The one-shot circuit 161 and the RSF/F 162 form a regeneration current period detecting unit for detecting a regeneration current period in which the switching element Q1 is off.

A voltage generated when the current flowing through the switching element Q1 flows through the current detecting resistor Rs (corresponding to a current detecting unit) is applied to a terminal P3 (corresponding to an OCP terminal).

The peak hold circuit 163 holds a peak value of a voltage of P3 (corresponding to the OCP terminal). The ½ converter 164 outputs a voltage which is ½ of the peak value held by the peak hold circuit 163, to the analog switch ASW1.

The analog switch ASW1 outputs the voltage from the ½ converter 164 which is ½ of the peak value, to an inverting input terminal of the voltage-current converting amplifier 165 only in a period between one pulse and the next pulse, i.e. in the regeneration current period of the reactor L1 in which the switching element Q1 is off. The ½ converter 164 and the analog switch ASW1 form a ½ output unit.

The analog switch ASW2 is turned on and off complementarily to the analog switch ASW1, and is on only in a period in which the switching element Q1 is on, to output the voltage of P3 (corresponding to the OCP terminal) to the inverting input terminal of the voltage-current converting amplifier 165.

The voltage-current converting amplifier 165 corresponds to an averaging unit. The voltage-current converting amplifier 165 converts a combination of the peak hold value from the analog switch ASW1 and the output voltage from the analog switch ASW2 to a current, integrates the current by using the capacitor Ccomp, and outputs the integrated output to the inverting input terminal of the current control error amplifier 13.

The voltage-current converting amplifier 165 and the capacitor Ccomp form a filter through which a detection signal of a current flowing in the reactor L1 is outputted, the filter forming part of the averaging unit and having a time constant longer than a half cycle of the alternating-current voltage an alternating-current power supply AC.

The PWM converter 14 corresponds to a control unit and turns the switching element Q1 on and off based on the output signal from the current control error amplifier 13 and the triangle wave signal from the triangle wave generator 12, in such way that an average current value of the current flowing in the reactor L1 becomes equal to a predetermined value.

Moreover, a response characteristic of the detecting unit 16 is delayed in such a way that an average value of the switching current flowing in the switching element Q1 becomes equal to an average value in a time which is longer than a half cycle of a sine wave of an alternating-current voltage of the alternating-current power supply AC.

In other words, the response time of an output signal of the detecting unit 16 is set to a response time which is equal to or longer than the half cycle of the rectified waveform of the alternating-current voltage of the alternating-current power supply AC. Hence, the peak value of the switching current flowing in the switching element Q1 increases and decreases in a manner similar to a full-wave rectified voltage waveform of the sine wave of the alternating-current power supply AC. The power supply device thus has a power-factor improving function.

Next, description is given of operations of the direct-current power supply device of Embodiment 1 configured as described above.

First, the current flowing in the switching element Q1 is detected as voltage drop by the current detecting resistor Rs and a detected voltage signal is sent to the detecting unit 16. The detecting unit 16 calculates an average current flowing in the LED group load device RL from the voltage signal from the current detecting resistor Rs, and outputs the average current to the current control error amplifier 13.

The PWM comparator 14 compares the triangle wave signal from the triangle wave generator 12 and an error voltage signal whose response time has been delayed in the current control error amplifier 13 to generate the on-off drive signal. The PWM comparator 14 then outputs the on-off drive signal to a gate of the switching element Q1 via the AND circuit 17 and performs on-off control of the switching element Q1.

Here, a voltage rectified and smoothed through the diode D2 is supplied from the auxiliary winding Nd of the reactor L1 as a power supply voltage of the control IC 10. Moreover, a voltage rectified through a diode D3 is inputted from the auxiliary winding Nd of the reactor L1 to the control IC 10 as a quasi-resonant signal and the quasi-resonant signal is detected as an end signal of the regeneration current flowing in the reactor L1.

Figure 4:
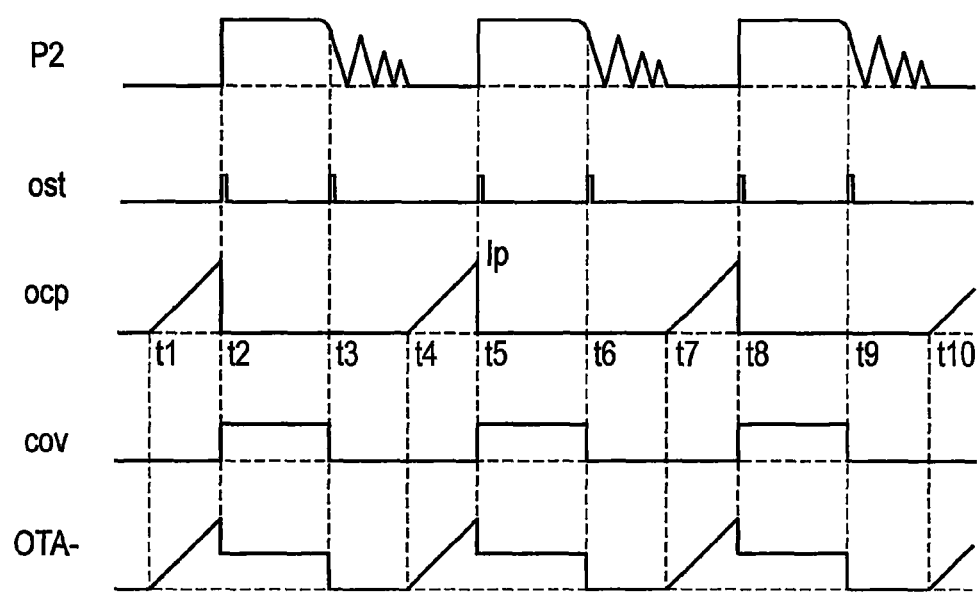
FIG. 4 is a timing chart showing operations of portions of the detecting unit shown in FIG. 3.
Figure 5:
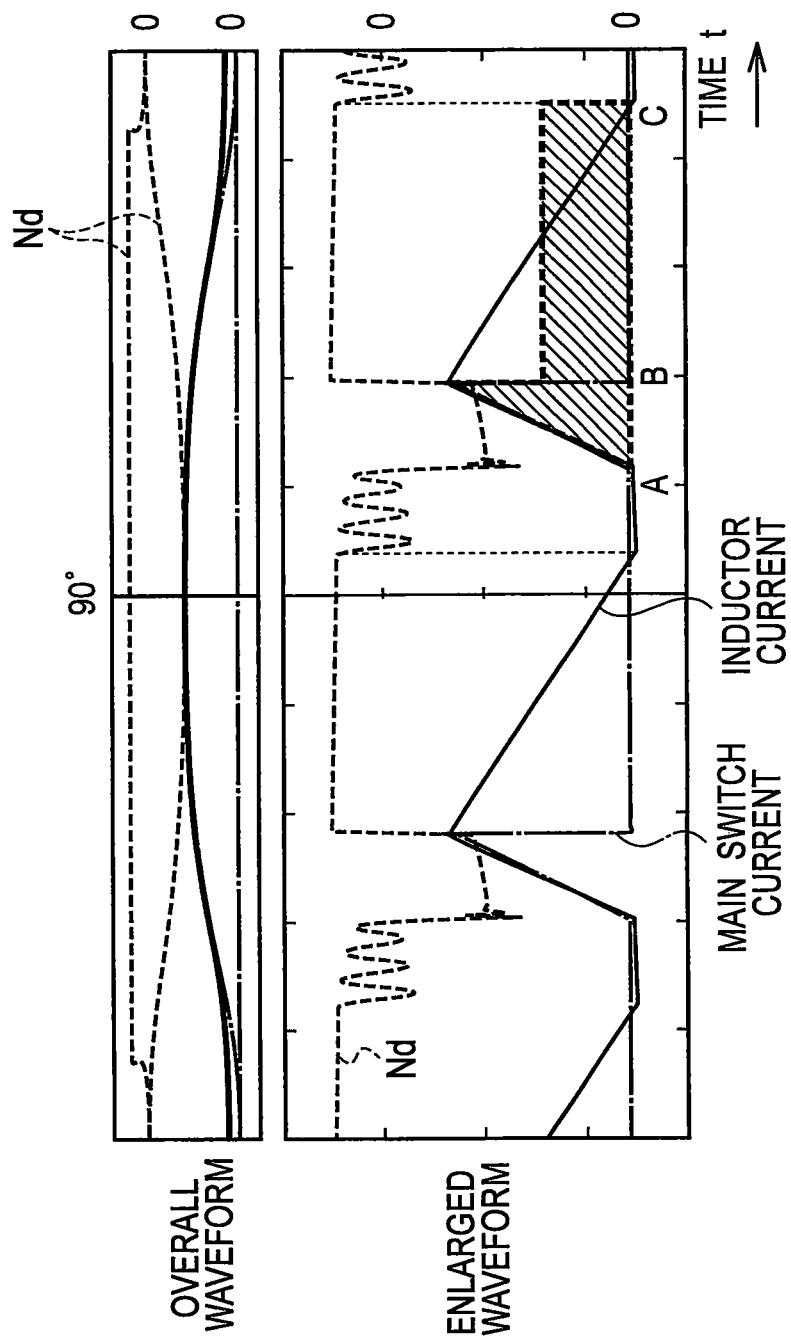
FIG. 5 is a timing chart showing an operation principle of the detecting unit shown in FIG. 3.
Figure 6:
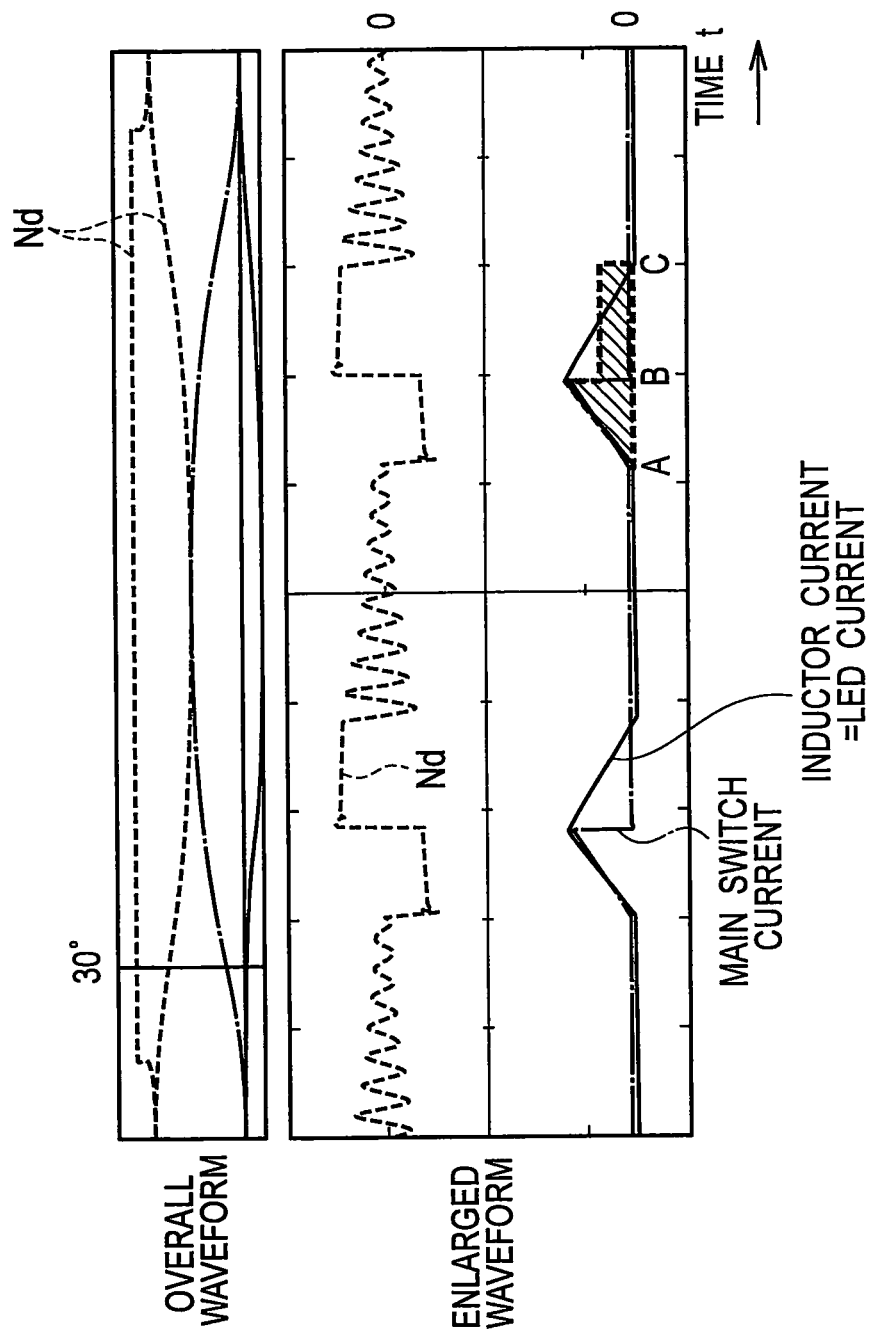
FIG. 6 is a timing chart showing an operation principle of the detecting unit shown in FIG. 3.

Next, detailed description is given of operations of the detecting unit 16 provided in the control IC 10 in the direct-current power supply device of Embodiment 1 with reference to FIGS. 3 to 6. FIG. 4 is a timing chart showing operations of portions of the detecting unit 16 shown in FIG. 3. FIGS. 5 and 6 are timing charts each showing an operation principle of the detecting unit shown in FIG. 3.

In FIG. 4, P2 denotes the voltage obtained by rectifying the voltage of the auxiliary winding Nd through the diode D3, ost denotes the output of the one-shot circuit 161, OCP denotes the current of the switching element Q1 flowing in the P3 terminal, cov denotes the output of the analog switch ASW1, OTA− denotes the voltage inputted into the inverting input terminal of the voltage-current converting amplifier 165.

FIG. 5 shows the current flowing in the switching element Q1, an inductor current, and the voltage of the auxiliary winding Nd at the time when the alternating-current voltage of the alternating-current power supply AC is highest. FIG. 6 shows the current flowing in the switching element Q1, the inductor current, and the voltage of the auxiliary winding Nd at the time when the alternating-current voltage of the alternating-current power supply AC is small.

First, at timing t1, when the switching element Q1 is turned on by the on-off drive signal, the current flows in a route from RC1 to RL, to Np, to Q1, and then to Rs. Then, in a period between the timings t1 and t2, the current flowing in the switching element Q1 (OCP of FIG. 4, a switching current in FIGS. 5 and 6) linearly rises.

At the timing t2, when the switching element Q1 is turned off by the on-off drive signal, the inductor current (the inductor current in FIGS. 5 and 6) flows in a route from Np to D1, to RL, and then to Np. The inductor current linearly drops.

At this time, the one-shot circuit 161 receives, via the comparator 15, the voltage P2 obtained by rectifying the voltage of the auxiliary winding Nd through the diode D3 and generates one pulse ost at each rising edge (for example, the timing t2 of FIG. 4) and each falling edge (for example, timing t3 of FIG. 4) of the voltage of the auxiliary winding Nd.

The RSF/F 162 outputs the on-off signal to the analog switch ASW1 for each pulse ost from the one-shot circuit 161.

The peak hold circuit 163 holds the peak value of the voltage of P3 (OCP) and the ½ converter 164 outputs the voltage which is ½ of the of the peak value held by the peak hold circuit 163, to the analog switch ASW1.

The analog switch ASW1 outputs the voltage from the ½ converter 164 which is ½ of the peak value, to the inverting input terminal of the voltage-current converting amplifier 165 as the ½ voltage signal cov (for example, a signal between the timings t2 and t3 in FIG. 4, a rectangular signal in a period when the inductor current is flowing in FIGS. 5 and 6) only in the period between one pulse and the next pulse, i.e. in the regeneration current period of the reactor L1 in which the switching element Q1 is off.

The analog switch ASW2 is on only in a period in which the switching element Q1 is on, and outputs the voltage of P3 (OCP) to the inverting input terminal of the voltage-current converting amplifier 165.

The voltage-current converting amplifier 165 converts the voltage (OTA– in FIG. 4) of a combination of the peak hold value from the analog switch ASW1 and the output from the analog switch ASW2 to a current, integrates the current by using the capacitor Ccomp, and outputs the integrated output to the inverting input terminal of the current control error amplifier 13.

Here, since ½ of the peak value of the inductor current (the current at the time of drop) is set as a vertical length of a rectangle in a period of the inductor current (the current at the time of drop), the area of a triangle of the inductor current (the current at the time of drop) is equal to the area of the rectangle (portion shown by dotted line) in the period of the inductor current (the current at the time of drop).

Accordingly, the sum of the area of the switching current (the current at the time of rise) and the area of the rectangle in the period of the inductor current (the current at the time of drop) which are shown in FIGS. 5 and 6 is equal to the sum of the area of the switching current (the current at the time of rise) and the area of the inductor current (the current at the time of drop) which are shown in FIGS. 5 and 6.

It is thereby possible to generate a feedback signal having the same area as an LED current waveform only by using the waveform of the switching current and output the feedback signal to the current control error amplifier 13.

Since the current control error amplifier 13 averages the feedback signal from the detecting unit 16, it is only necessary that the sum of the area of the switching current (the current between A and B at the time of rise) and the area of the rectangle in the period of the inductor current (the current between B and C at the time of drop) is equal to the sum of the area of the switching current (the current between A and B at the time of rise) and the area of the inductor current (the current between B and C at the time of drop).

Figure 7:
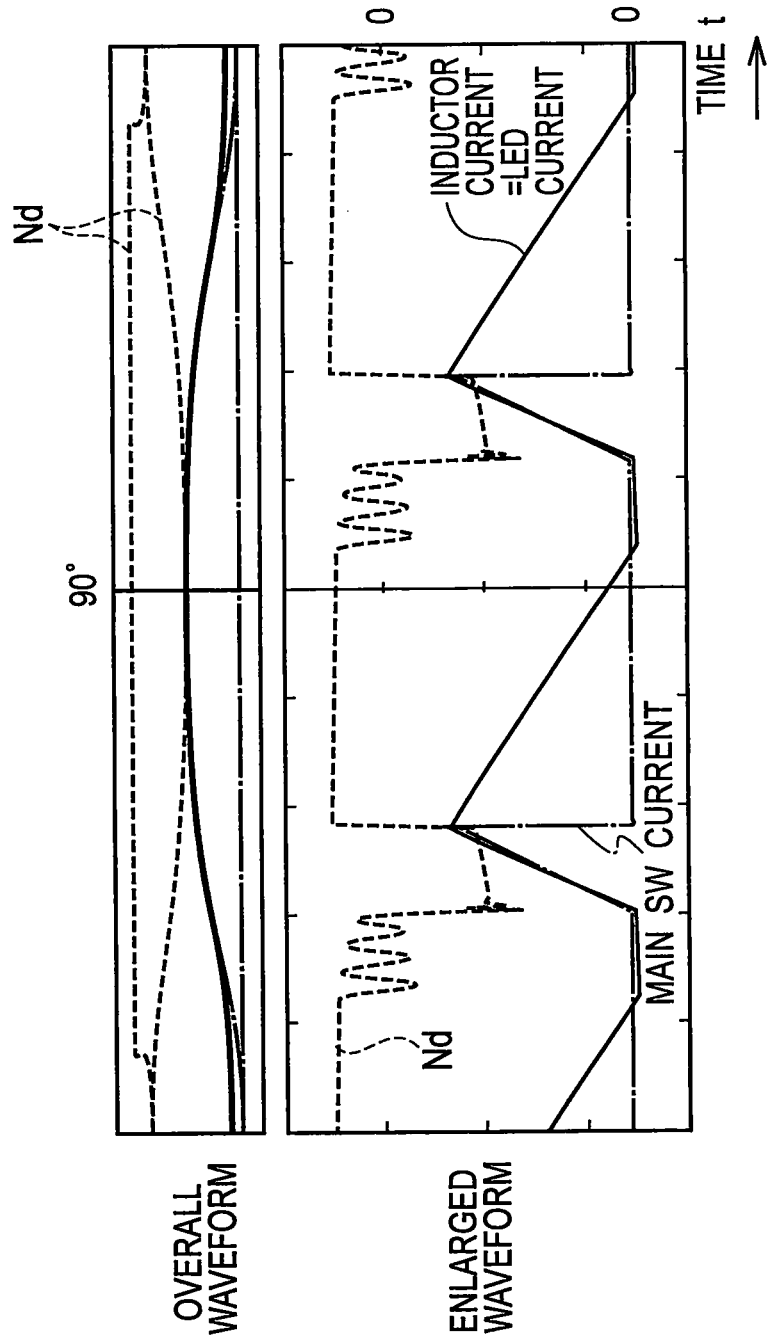
FIG. 7 is a timing chart showing an example of operation waveforms in a conventional technique.

FIG. 7 is a timing chart showing an example of operation waveforms in a conventional technique. As shown in FIG. 7, the current of the switching element Q1 is an intermittent current of a triangle wave while an LED current (=the inductor current) has a waveform which gently decreases after the intermittent current, and is detected by the high-side current detecting unit 20.

On the other hand, in the direct-current power supply device of Embodiment 1, as shown in FIGS. 5 and 6, the feedback signal for constant current control is acquired by obtaining the LED current waveform from only the current waveform of the switching element Q1.

As described above, in the direct-current power supply device of Embodiment 1, constant current characteristics can be obtained even in a special case where a current waveform of a switching element is a sine wave such as in a power-factor improving chopper of a converter.

Moreover, since no LED load current detecting circuit is required, none of the current detecting resistor, the constant current feed back circuit, the photocoupler, and the like is required. Accordingly, a small and low-cost direct-current power supply device can be provided.

Embodiment 2

Figure 8:
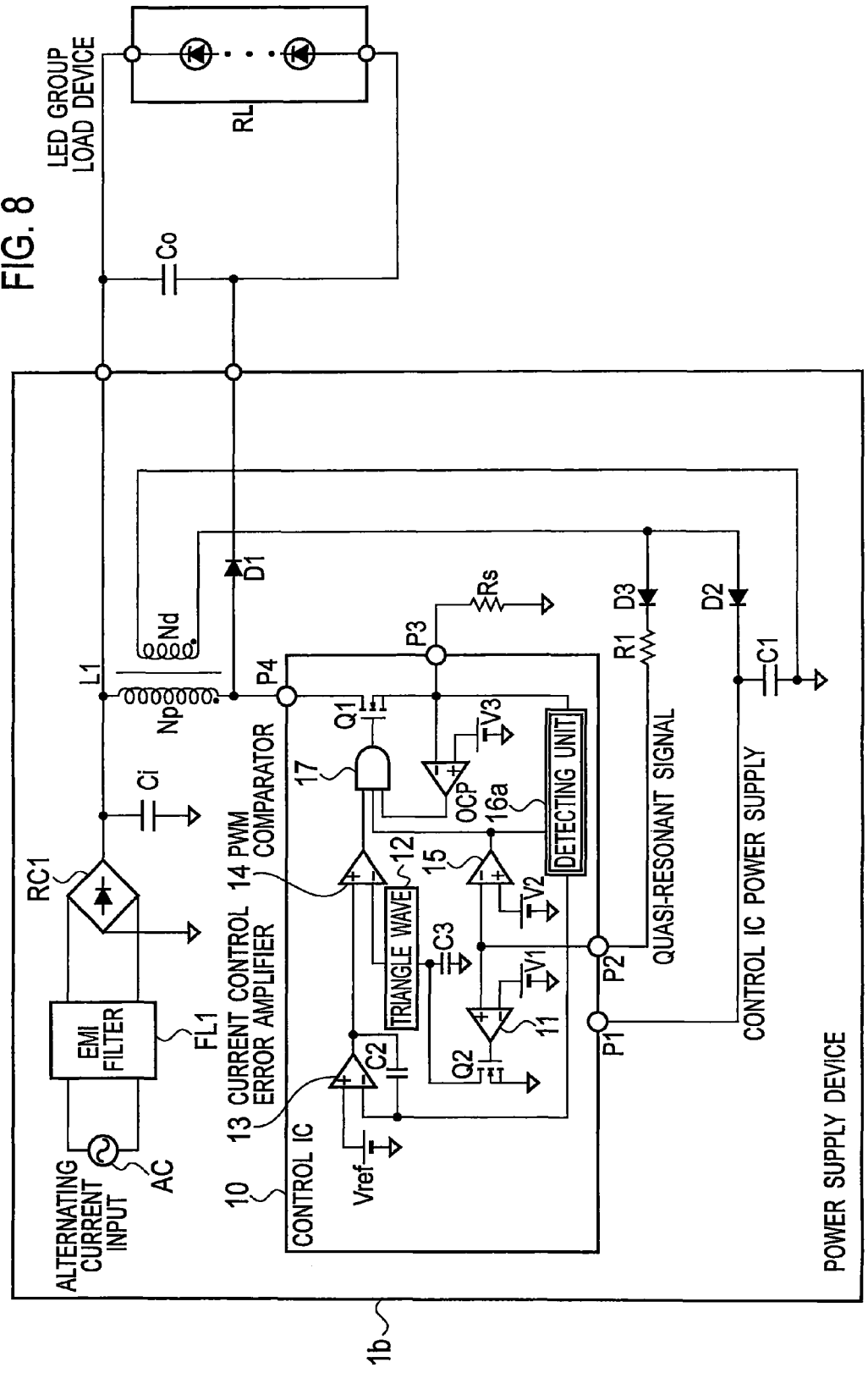
FIG. 8 is a block diagram showing a configuration of a direct-current power supply device in Embodiment 2 of the present invention.

FIG. 8 is a block diagram showing a configuration of a direct-current power supply device in Embodiment 2 of the present invention. The direct-current power supply device shown in FIG. 2 is applied to a step-down chopper circuit while the direct-current power supply device shown in FIG. 8 is applied to a step-up and step-down chopper circuit.

In FIG. 8, a reactor L1 includes a main winding Np and an auxiliary winding Nd. A series circuit of the main winding Np, a switching element Q1, and a current detecting resistor Rs is connected to an output terminal of a full-wave rectifier circuit RC1. One terminal of an LED group load device RL and one terminal of a smoothing capacitor Co are connected to one terminal of the main winding Np. An anode of a diode D1 is connected to the other terminal of the main winding Np. The other terminal of the LED group load device RL and the other terminal of the smoothing capacitor Co are connected to a cathode of the diode D1.

Figure 9:
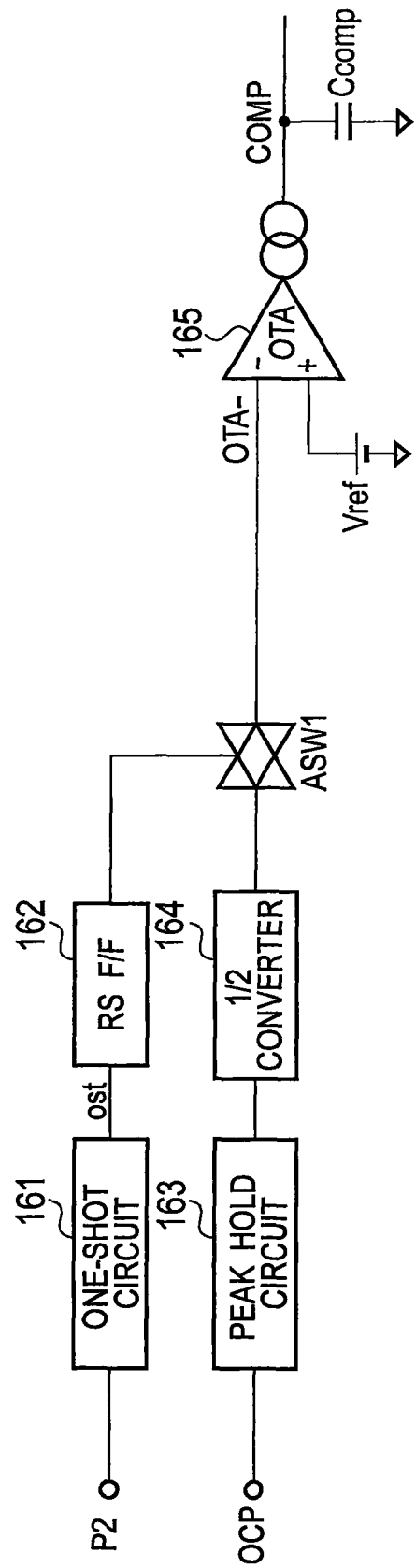
FIG. 9 is a diagram showing a configuration example of a detecting unit in the direct-current power supply device shown in FIG. 8.

FIG. 9 is a diagram showing a configuration example of a detecting unit in the direct-current power supply device shown in FIG. 8. As shown in FIG. 9, the detecting unit 16*a* includes an one-shot circuit 161, a RSF/F 162, a peak hold circuit 163, a ½ converter 164, an analog switch ASW1, a voltage-current converting amplifier 165, and a capacitor Ccomp.

First, when the switching element Q1 is turned on, the current flows in a route from RC1 to Np, to Q1, and then to Rs. Then, when the switching element Q1 is turned off, the current flows to the LED group load device RL in a route from Np to D1, to RL, and then to Np. In other words, the current flows in the LED group load device RL only when the switching element Q1 is off. Accordingly, the current needs to be generated in the detecting unit 16*a* only when the switching element Q1 is off.

Figure 10:
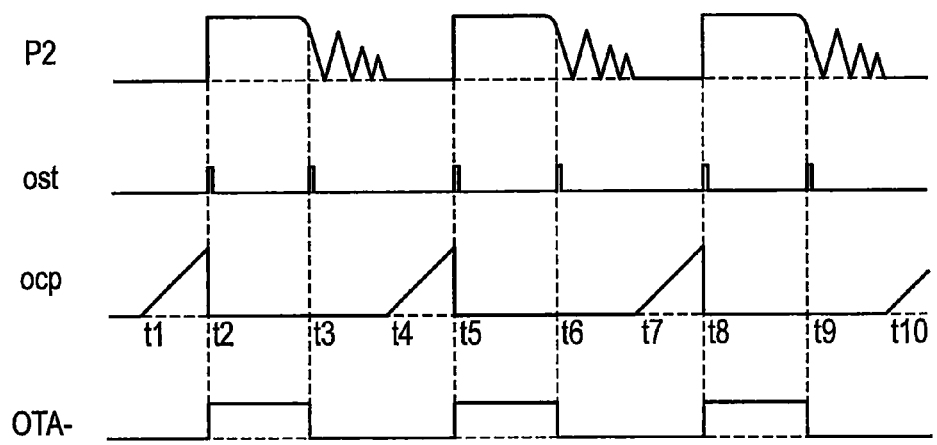
FIG. 10 is a timing chart showing operations of portions of the detecting unit shown in FIG. 8.

Operations of the detecting unit 16*a* are described below. As shown in FIG. 10, the one-shot circuit 161 receives, via a comparator 15, a voltage P2 obtained by rectifying a voltage of the auxiliary winding Nd through a diode D3, and generates one pulse each time of the voltage of the auxiliary winding Nd rises and each time the voltage of the auxiliary winding Nd drops. The RSF/F 162 outputs an on-off signal to the analog switch ASW1 for each pulse from the one-shot circuit 161.

The peak hold circuit 163 holds a peak value of a voltage of OCP. The ½ converter 164 outputs a voltage which is ½ of the peak value held by the peak hold circuit 163, to the analog switch ASW1.

The analog switch ASW1 outputs the voltage from the ½ converter 164 which is ½ of the peak value, to an inverting input terminal of the voltage-current converting amplifier 165 only in a period between one pulse and the next pulse, i.e. in a regeneration current period of the reactor L1 in which the switching element Q1 is off.

The voltage-current converting amplifier 165 converts the peak hold value from the analog switch ASW1 to a current, integrates the current by using the capacitor Ccomp, and outputs the integrated output to the inverting input terminal of the current control error amplifier 13.

Accordingly, it is possible to generate a current in detecting unit 16*a* and output this current to the current control error amplifier 13 only when the switching element Q1 is off. Thus, effects similar to those of the direct-current power supply device in Embodiment 1 can be obtained also in the direct-current power supply device in Embodiment 2.

Figure 11:
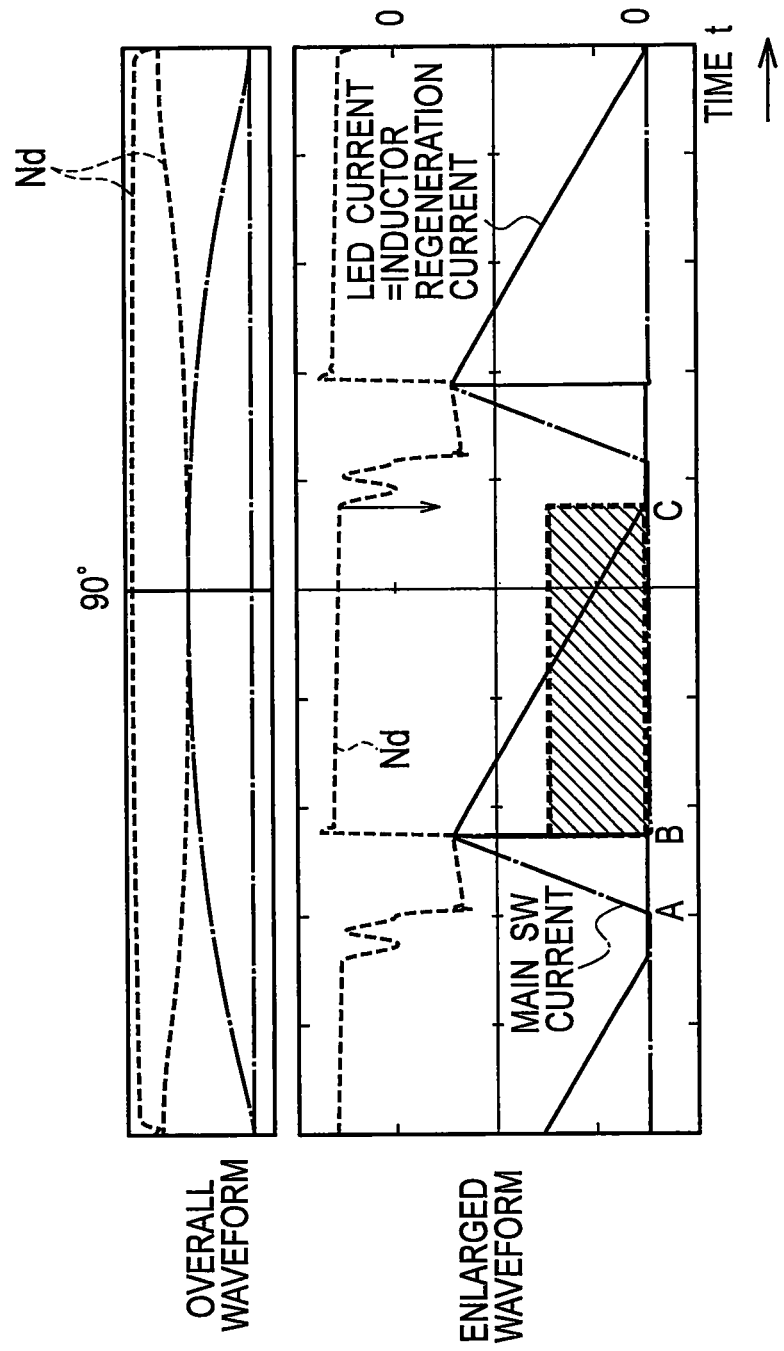
FIG. 11 is a timing chart showing an operation principle of the detecting unit shown in FIG. 8.
Figure 12:
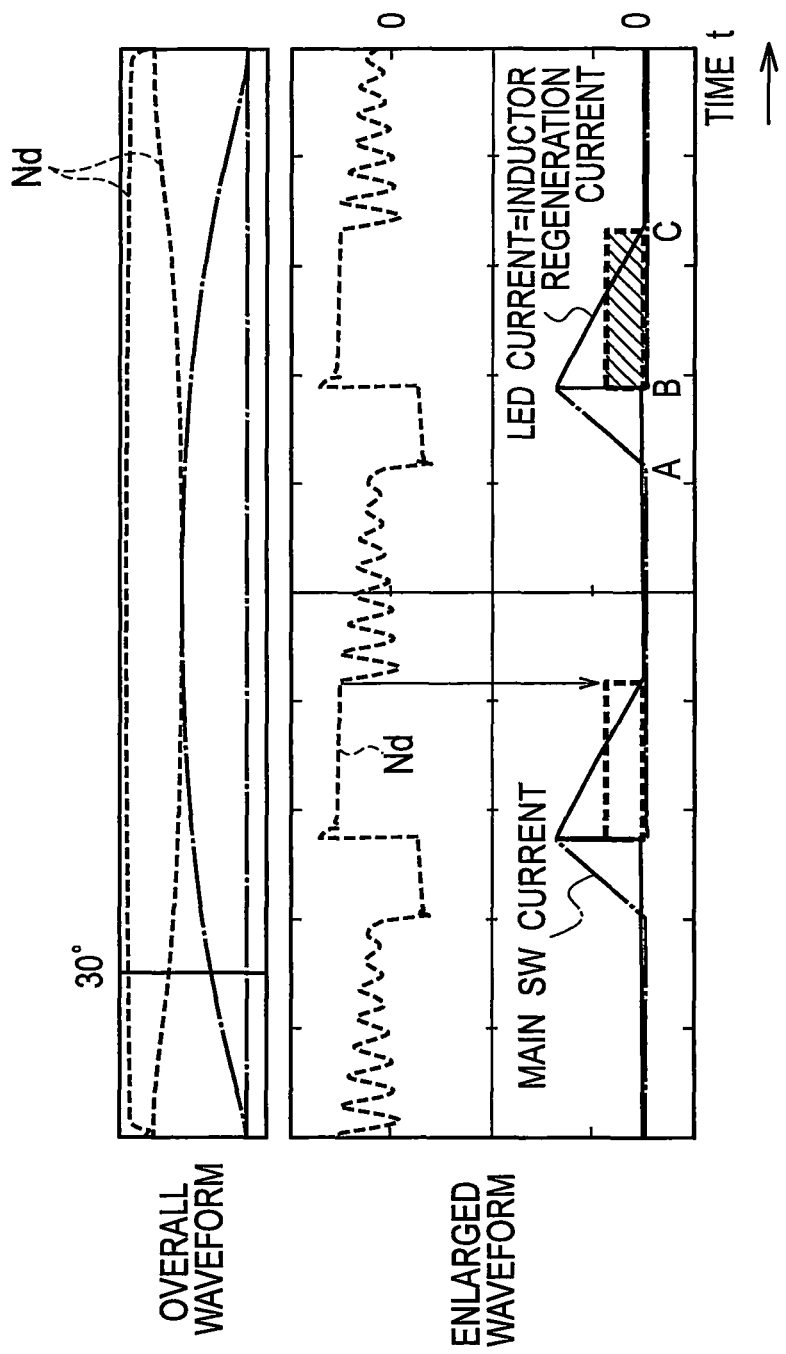
FIG. 12 is a timing chart showing an operation principle of the detecting unit shown in FIG. 8.

FIGS. 11 and 12 are timing charts each showing an operation principle of the detecting unit shown in FIG. 8. In FIG. 11, Nd denotes the voltage of the auxiliary winding Nd, ost denotes the output of the one-shot circuit 161, OCP denotes a current of the switching element Q1 flowing in a P3 terminal, and OTA− denotes the voltage inputted into the inverting input terminal of the voltage-current converting amplifier 165.

FIG. 11 shows the current flowing in the switching element Q1, an inductor current, and the voltage of the auxiliary winding Nd at the time when an alternating-current voltage of an alternating-current power supply AC is highest. FIG. 12 shows the current flowing in the switching element Q1, the inductor current, and the voltage of the auxiliary winding Nd at the time when the alternating-current voltage of the alternating-current power supply AC is small.

Embodiment 3

Figure 13:
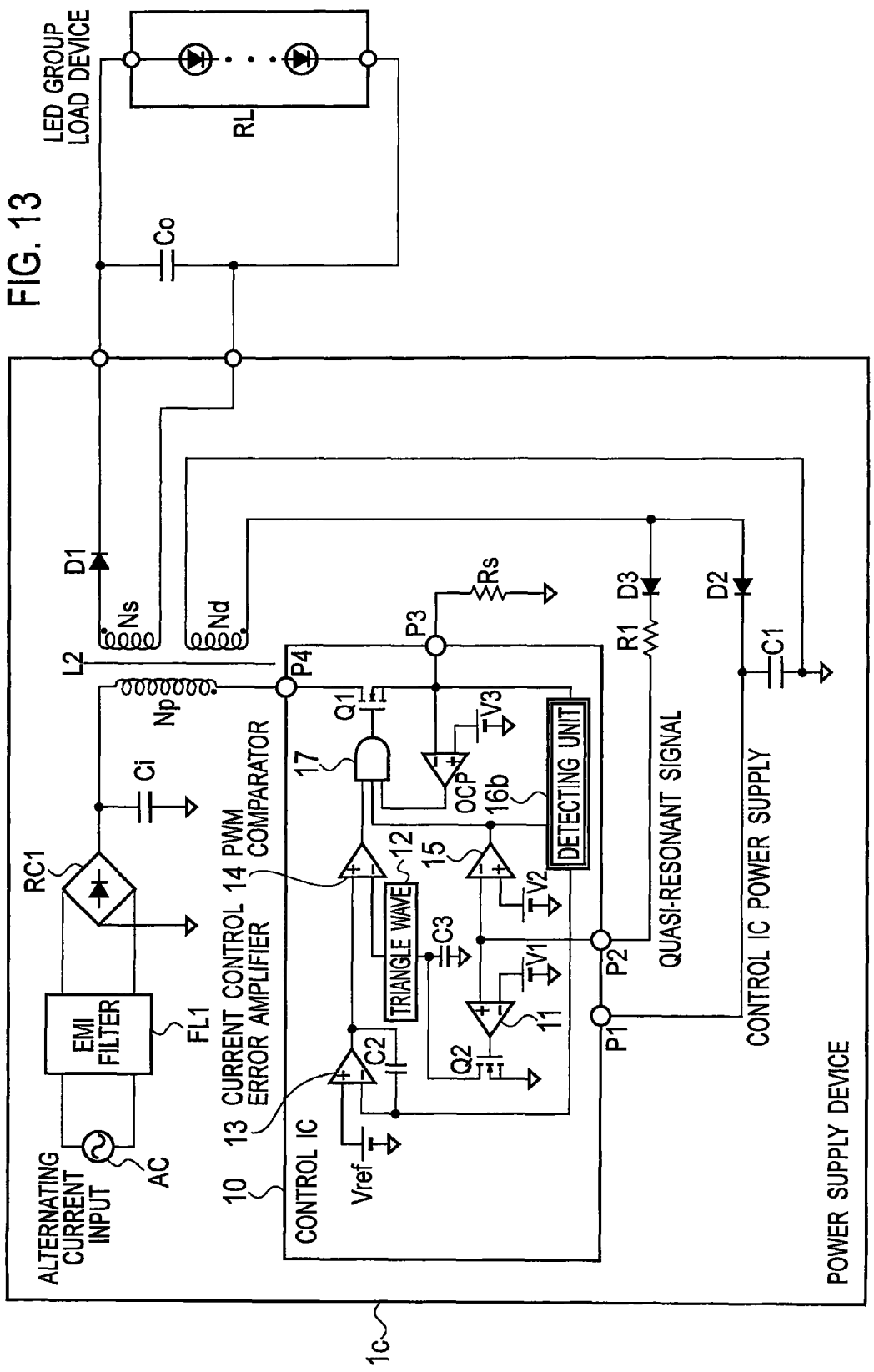
FIG. 13 is a block diagram showing a configuration of a direct-current power supply device in Embodiment 3 of the present invention.

FIG. 13 is a block diagram showing a configuration of a direct-current power supply device in Embodiment 3 of the present invention. The direct-current power supply device 1a shown in FIG. 2 is applied to a step-down chopper circuit while the direct-current power supply device 1c shown in FIG. 13 is applied to a flyback circuit.

In FIG. 13, a reactor L2 includes a main winding Np (primary winding), a secondary winding Ns, and an auxiliary winding Nd. A series circuit of the main winding Np, a switching element Q1, and a current detecting resistor Rs is connected to an output terminal of a full-wave rectifier circuit RC1. One terminal of an LED group load device RL and one terminal of a smoothing capacitor Co are connected to one terminal of the secondary winding Ns via a diode D1. The other terminal of the LED group load device RL and the other terminal of the smoothing capacitor Co are connected to the other terminal of the secondary winding Ns. Connection of the auxiliary winding Nd is the same as that shown in FIG. 2.

Figure 14:
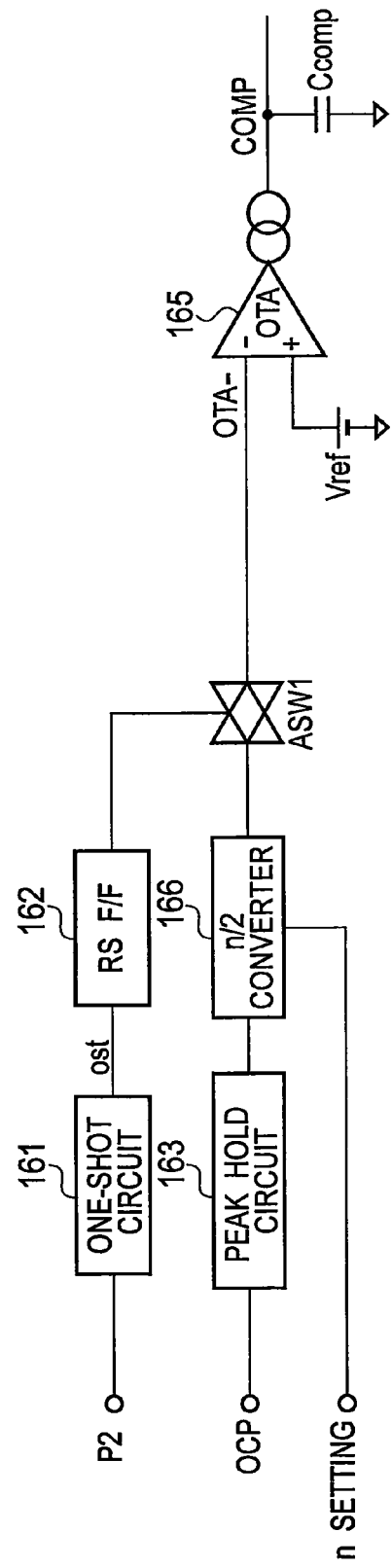
FIG. 14 is a diagram showing a configuration example of a detecting unit in the direct-current power supply device shown in FIG. 13.

FIG. 14 is a diagram showing a configuration example of a detecting unit in the direct-current power supply device shown in FIG. 13. As shown in FIG. 14, the detecting unit 16b includes an one-shot circuit 161, a RSF/F 162, a peak hold circuit 163, an n/2 converter 166, an analog switch ASW1, a voltage-current converting amplifier 165, and a capacitor Ccomp.

Note that n of the n/2 converter 166 is a winding turns ratio between the primary winding Np and the secondary winding Ns and n is set as a default.

First, when the switching element Q1 is turned on, the current flows in a route from RC1 to Np, to Q1, and then to Rs. At this time, no current flows in the LED group load device RL due to a voltage of the secondary winding Ns.

Then, when the switching element Q1 is turned off, the current flows to the LED group load device RL in a route from Ns to D1, to RL, and then to Ns. In other words, the current flows in the LED group load device RL only when the switching element Q1 is off. Accordingly, the current needs to be generated in the detecting unit 16b only when the switching element Q1 is off.

Figure 15:
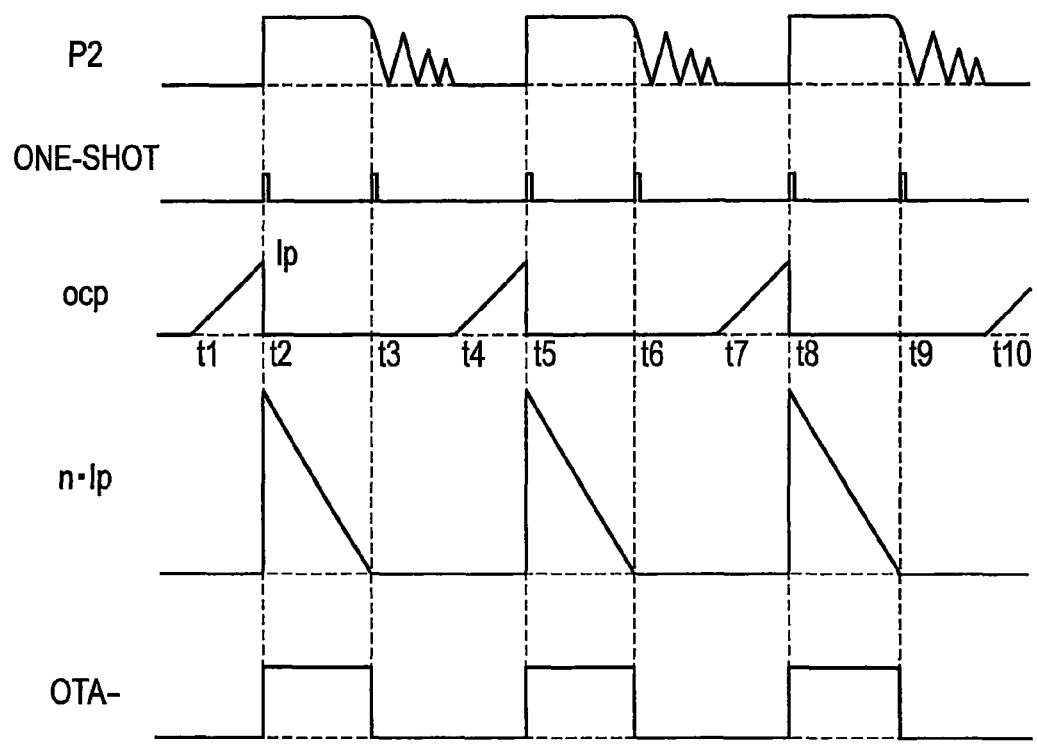
FIG. 15 is a timing chart showing operations of portions of the detecting unit shown in FIG. 13.

Operations of the detecting unit 16b are described below. As shown in FIG. 15, the one-shot circuit 161 receives, via a comparator 15, a voltage P2 obtained by rectifying the voltage of the auxiliary winding Nd through a diode D3, and generates one pulse at each rising edge and each falling edge of the voltage of the auxiliary winding Nd. The RSF/F 162 outputs an on-off signal to the analog switch ASW1 for each pulse from the one-shot circuit 161.

The peak hold circuit 163 holds a peak value of a voltage of OCP. The n/2 converter 166 outputs a voltage which is n/2 of the peak value held by the peak hold circuit 163, to the analog switch ASW1.

The analog switch ASW1 outputs the voltage from the n/2 converter 166 which is n/2 of the peak value, to an inverting input terminal of the voltage-current converting amplifier 165, only in a period between one pulse and the next pulse, i.e. in a regeneration current period of the reactor L2 in which the switching element Q1 is off.

The voltage-current converting amplifier 165 converts the peak hold value from the analog switch ASW1 to a current, integrates the current by using the capacitor Ccomp, and outputs the integrated output to the inverting input terminal of the current control error amplifier 13.

Accordingly, it is possible to generate a current in detecting unit 16b and output this current to the current control error amplifier 13 only when the switching element Q1 is off. Thus, effects similar to those of the direct-current power supply device in Embodiment 1 can be obtained also in the direct-current power supply device in Embodiment 3.

When the winding·turns ratio between the primary winding Np and the secondary winding Ns in the reactor L2 is set to n:1, a peak current n-times that of the primary winding Np flows in the secondary winding Ns. Accordingly, the average value of the current in the period when the current is flowing to the secondary winding side is ½ of n×Ip and 0.5Ip×n is an OTA− signal. Here, Ip is the peak value of the current flowing in the switching element Q1.

As described above, effects similar to those of the direct-current power supply device in Embodiment 1 can be obtained also in the direct-current power supply device of Embodiment 3.

In the present invention, the peak value of the current detected by the current detecting unit is held, n/2 of the held peak value is outputted only in the regeneration current period of the reactor, the output of the n/2 output unit is converted to a current, and the current is integrated and outputted.

Hence, the feedback signal having the same area as the load current waveform can be generated by using only the waveform of the switching current. Accordingly, a direct-current power supply device which is low in cost and which has a simple circuit configuration can be provided.

The present invention can be applied to power-factor improving circuits and AC-DC converters.

What is claimed is:

1. A direct-current power supply device comprising:
a rectifier configured to perform full-wave rectification of an alternating-current voltage of an alternating-current power supply and convert the alternating-current voltage to a direct-current voltage;
a converter including a switching element, a reactor, and a diode, the converter configured to convert the direct-current voltage of the rectifier to another direct-current voltage by turning the switching element on and off and supply the other direct-current voltage to a load;
a current detecting unit configured to detect a switching current flowing in the switching element;
a peak hold unit configured to hold a peak value of the current detected by the current detecting unit;
a regeneration current period detecting unit configured to detect a regeneration current period of the reactor when the switching element turns off;
an ½ output unit configured to output ½ of the peak value held by the peak hold unit only in the regeneration current period of the reactor;
an averaging unit configured to convert the switching current and an output of the ½ output unit to a current, and generate a feedback signal by integrating the converted current, wherein the feedback signal is generated using only a waveform of the switching current and a signal having the same area as a load current waveform when the switching element turns on and turns off, wherein the feedback signal is outputs a detection signal of the current flowing in the reactor and is output through a filter which has a time constant longer than a half cycle of the alternating-current voltage of the alternating-current power supply; and a control unit configured to turn the switching element on and off based on the feedback signal of the averaging unit in such a way that an average current value of a current flowing in the reactor is equal to a predetermined value, wherein the converter includes a step-down converter.

2. The direct-current power supply device according to claim 1, wherein the reactor includes a main winding and an auxiliary winding, the regeneration current period detecting unit configured to detect a regeneration current period of the reactor based on a voltage generated in the auxiliary winding.

3. A direct-current power supply device comprising:

a rectifier configured to perform full-wave rectification of an alternating-current voltage of an alternating-current power supply and convert the alternating-current voltage to a direct-current voltage;

a converter including a switching element, a reactor, and a diode, the converter configured to convert the direct-current voltage of the rectifier to another direct-current voltage by turning the switching element on and off and supply the other direct-current voltage to a load;

a current detecting unit configured to detect a switching current flowing in the switching element;

a peak hold unit configured to hold a peak value of the current detected by the current detecting unit;

a regeneration current period detecting unit configured to detect a regeneration current period of the reactor when the switching element turns off;

an ½ output unit configured to output ½ of the peak value held by the peak hold unit only in the regeneration current period of the reactor;

an averaging unit configured to convert an output of the ½ output unit to a current, and generate a feedback signal by integrating the converted current, wherein the feedback signal is generated by using only a waveform of the switching current and a signal having the same area as a load current waveform when the switching element turns on and turns off, wherein the feedback signal is a detection signal of the current flowing in the reactor and is output through a filter which has a time constant longer than a half cycle of the alternating-current voltage of the alternating-current power supply; and a control unit configured to turn the switching element on and off based on the feedback signal of the averaging unit in such a way that an average current value of a current flowing in the reactor is equal to a predetermined value, wherein the converter includes a step-up and step-down converter.

4. A direct-current power supply device comprising:

a rectifier configured to perform full-wave rectification of an alternating-current voltage of an alternating-current power supply and convert the alternating-current voltage to a direct-current voltage;

a converter including a switching element, a reactor, and a diode, the converter configured to convert the direct-current voltage of the rectifier to another direct-current voltage by turning the switching element on and off and supply the other direct-current voltage to a load;

a current detecting unit configured to detect a switching a-current flowing in the switching element;

a peak hold unit configured to hold a peak value of the current detected by the current detecting unit;

a regeneration current period detecting unit configured to detect a regeneration current period of the reactor when the switching element turns off;

an n/2 output unit configured to output n/2 of the peak value held by the peak hold unit only in the regeneration current period of the reactor;

an averaging unit configured to convert an output of the n/2 output unit to a current, and to generate a feedback signal by integrating the converted current, wherein the feedback signal is generated using only a waveform of the switching current and a signal having the same area as a load current waveform when the switching element turns on and turns off, wherein the feedback signal is a detection signal of the current flowing in the reactor and is output through a filter which has a time constant longer than a half cycle of the alternating-current voltage of the alternating-current power supply; and a control unit configured to turn the switching element on and off based on the feedback signal of the averaging unit in such a way that an average current value of a current flowing in the reactor is equal to a predetermined value, wherein the reactor includes a main winding and an auxiliary winding, the regeneration current period detecting unit configured to detect a regeneration current period of the reactor based on a voltage generated in the auxiliary winding, the converter includes a flyback converter, the reactor further includes a secondary winding, a value of n is a winding turns ratio between the main winding and the secondary winding.

5. The direct-current power supply device according to claim 1, wherein the control unit performs constant current control by controlling an output of the averaging unit in such a way that the output is equal to a predetermined value.

* * * * *